Feb. 19, 1935. H. T. NEUMANN 1,991,768
CAMERA AND ACCESSORY THEREFOR
Filed March 2, 1933 3 Sheets-Sheet 3
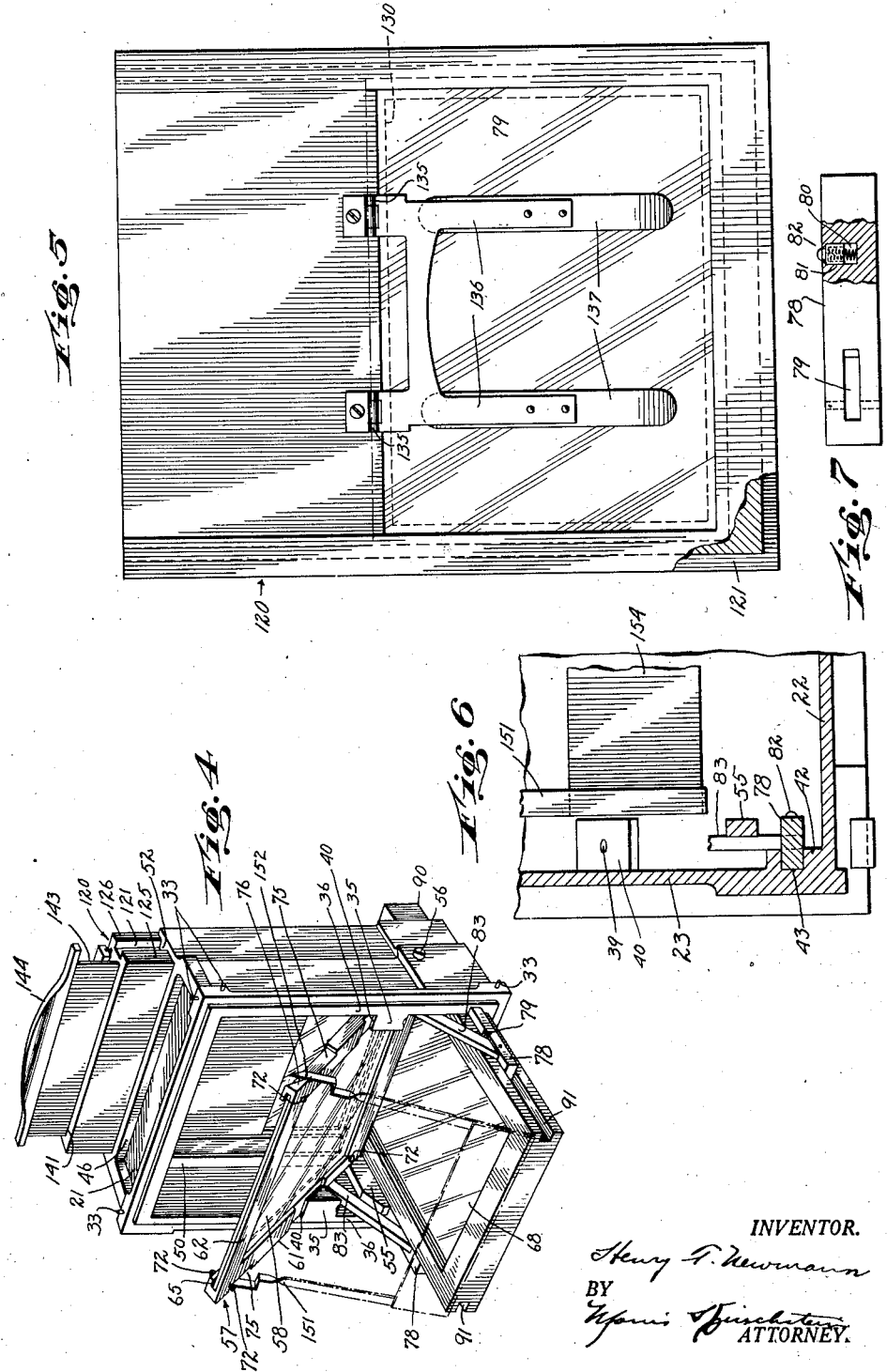
INVENTOR.
Henry T. Neumann
BY
ATTORNEY.

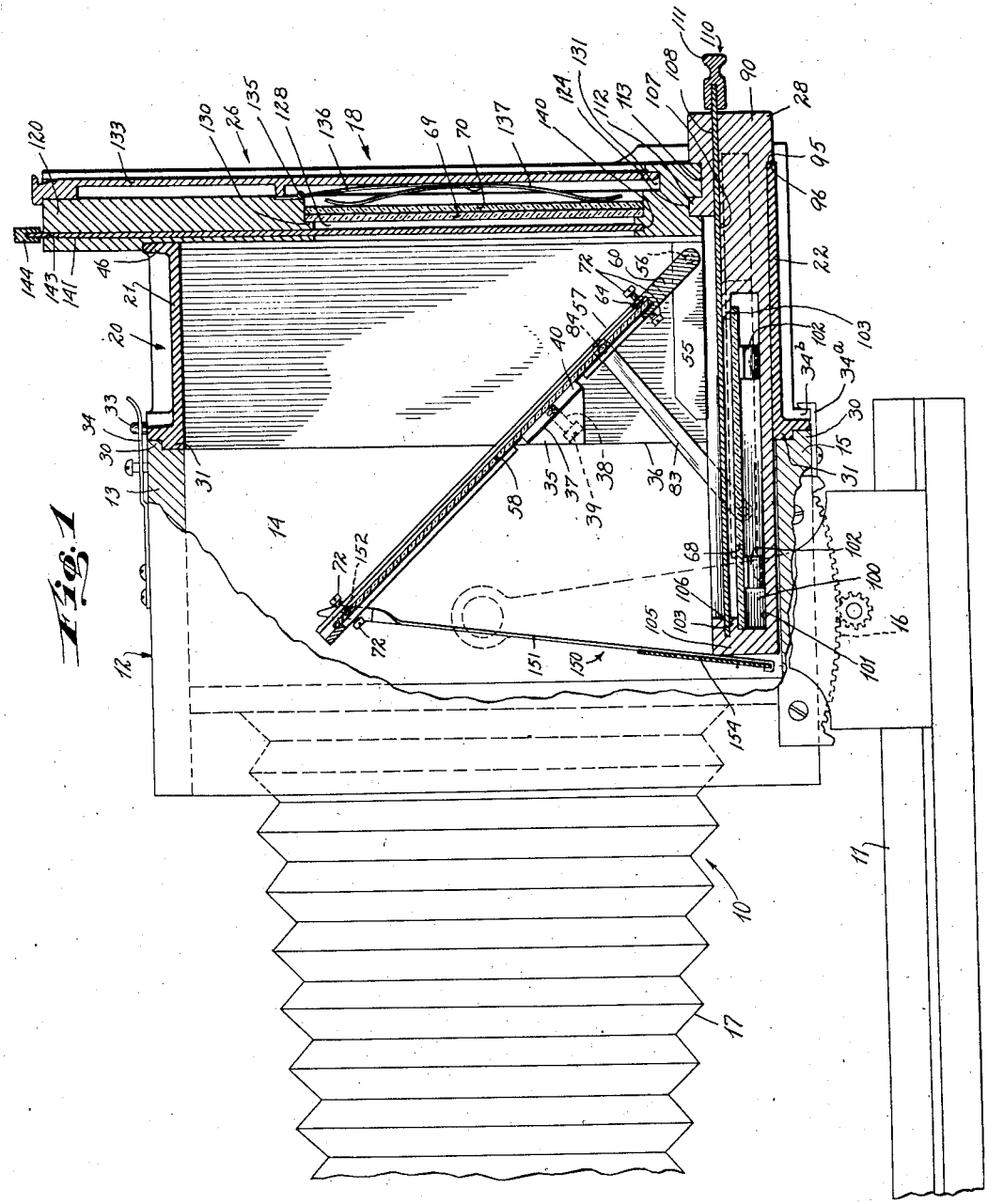

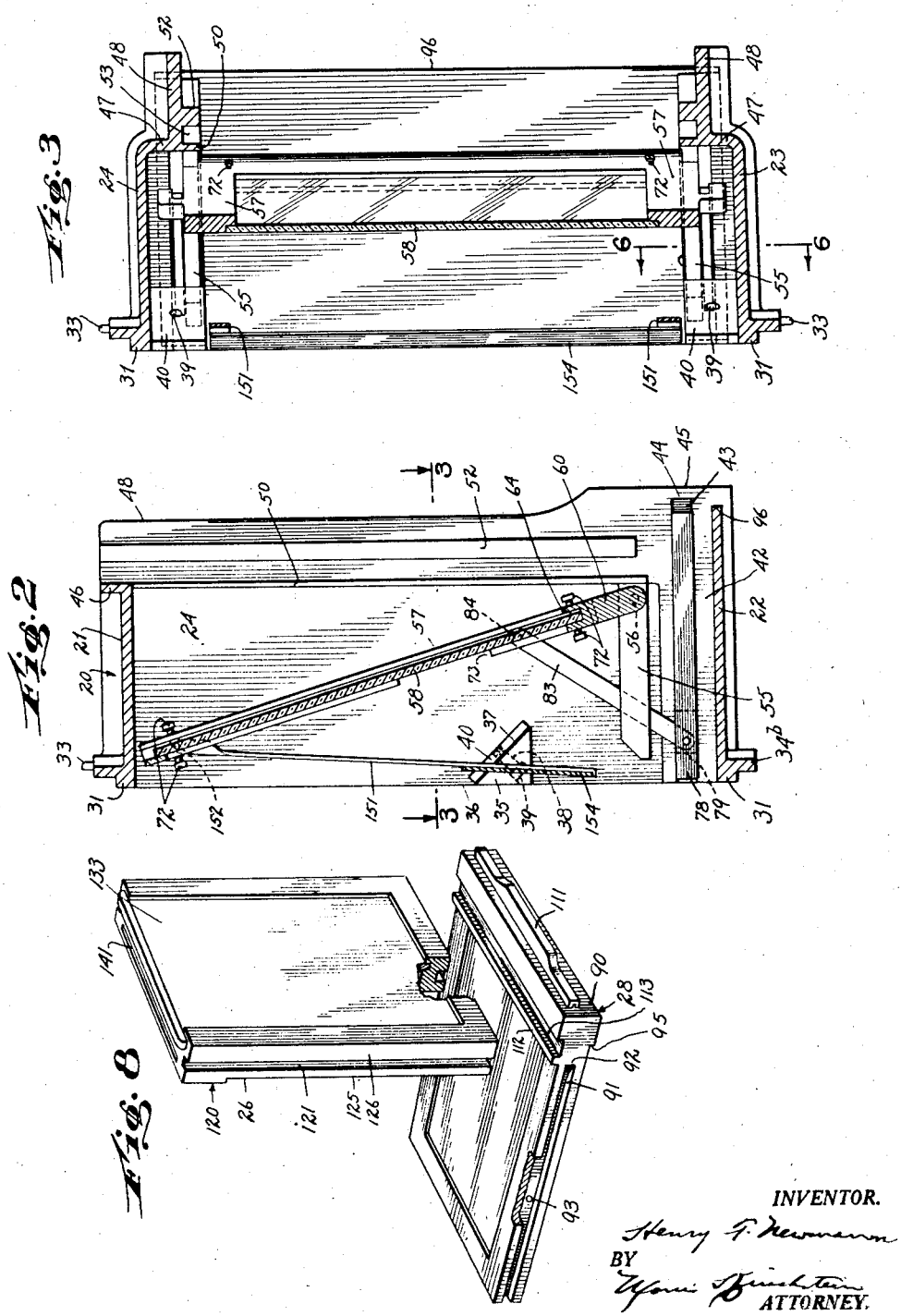

Patented Feb. 19, 1935

1,991,768

UNITED STATES PATENT OFFICE 1,991,768

CAMERA AND ACCESSORY THEREFOR

Henry T. Neumann, New York, N. Y.

Application March 2, 1933, Serial No. 659,337

30 Claims. (Cl. 95—2)

This invention relates to cameras and accessories therefor. It is particularly directed to a camera for color photography and an accessory at the rear of the camera to adapt the same for taking a three colored photograph with a single exposure.

An object of this invention is to provide an accessory of the character described, which may be incorporated into a camera when manufacturing the same or may be detachably attached to cameras now in use.

A further object of this invention is to provide a device of the character described which shall be extremely compact, easy to manipulate, positively light-tight, comprise comparatively few and simple parts, accurate in operation, relatively inexpensive to manufacture, and withal practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention, Fig. 1 is a side elevational view of a camera provided with an accessory embodying the invention, with parts broken away to show the interior construction and showing the camera and accessory in position for use;

Fig. 2 is a side elevational sectional view of the accessory embodying the invention;

Fig. 3 is a cross-sectional view taken on line 3—3 of Fig. 2;

Fig. 4 is a perspective view of the accessory embodying the invention, with the parts in position for use;

Fig. 5 is a rear elevational view of the accessory embodying the invention;

Fig. 6 is a cross-sectional view taken on line 6—6 of Fig. 3;

Fig. 7 is a top plan view of a detail, with parts in cross-section; and

Fig. 8 is a perspective view of the cassettes shown in relative position and with parts in cross-section.

Referring now in detail to the drawings, 10 designates a camera which may be of any suitable construction, and comprises generally a base 11 on which is mounted a casing 12. Said casing may comprise a top wall 13, side walls 14 and a bottom wall 15 and receives the bellows 17 which may be projected therefrom in the usual manner.

The casing 12 is preferably open at the rear and may be mounted on the base for angular adjustment by any suitable gearing mechanism 16, well known in the art. Removably attached to the rear open end of the casing 12, is an accessory 18 embodying the invention. The device 18 may comprise a substantially rectangular frame 20 made of metal or any other suitable material and comprises a top wall 21, a bottom wall 22 and side walls 23 and 24. The frame 20 is open at the front and rear thereof and provided with means for supporting a vertical frame holder or cassette 26 and horizontal plate holder or cassette 28. The frame 20 may be attached to the casing 12 by means of complementary overlapping or interengaging flange portions 30 and 31 on the rear of the casing and front of the frame, respectively, and pins 33 on the sides and top of said frame, received in openings on spring fingers 34 fixed to the casing; whereby the frame 20 forms a rearwardly extending continuation or extension on the casing 12. Hooked members 34a attached to the bottom of casing 12 engage a tongue 34b on the bottom of frame 20 to support the latter. The spring fingers 34 and hooked members 34a are provided on most cameras for supporting a cassette at the rear and hence the accessory 18 may be attached to the rear of the usual camera.

For the purpose hereinafter appearing, the side walls 23 and 24 are formed with similar inwardly extending, symmetrically disposed projections 35 spaced above the bottom wall 22 and adjacent the front edges 36 of said side walls. Each projection 35 is of substantial triangular vertical cross-section and is formed with a surface 37 disposed at preferably an angle of 45° to the horizontal bottom wall 22. Each projection 35 is further formed with a through opening 38 perpendicular to said surface 37 and slidably receiving a screw 39 to the outer end of which there is screwed a plate 40 overlying said surface 37 and adapted to be adjusted with respect to said surface by manipulating the screw 39 and inserting shims between said plate and surface. Said side walls 23 and 24 are further provided at the bottom ends thereof with inwardly projecting horizontal shoulders 42 having horizontal grooves 43 somewhat spaced from the bottom wall 22. The top wall 21 of the frame 20 is of less width front to back than the bottom wall 22 and terminates short of the rear edges of the side walls 23 and 24, in an upwardly extending flange portion 46. Said side walls 23 and 24 are formed with inwardly extending aligned vertical wall portions 47 disposed in the same plane as said flange 46 in the top wall 21, and extending from the wall portions 47 are parallel, vertical wall portions 48. Extending from the junction of the wall portions 47 and 48 are inwardly extending, vertical, aligned walls 50 likewise disposed in the plane of the extension or wall 46, and terminating somewhat above the groove 43. There is further formed on each of the vertical walls 48, inwardly extending aligned vertical tongues 52 forming with the walls or flanges 50, grooves 53 for the purpose hereinafter appearing. The tongues 52 likewise terminate short of the grooves 43.

Extending forwardly from the wall portions 50 are horizontal bars 55 parallel to the side walls and spaced therefrom and disposed somewhat above the shoulders 42, said bars terminating somewhat short of the front edges 36 of said side walls. Pivoted to the rear ends of said bars 55 and adjacent the lower end of the walls 50 as at 56, is a frame 57 for holding a combined light filter and reflector plate 58. The frame may be of general rectangular shape and is provided with a bottom portion 60, side portions 61 and an outer portion 62. The bottom portion is formed with a slot 64 and the side portions are formed with slots 65 extending to the outer end of the frame for slidably receiving the plate 58.

It will be noted that the frame 57 may swing about the pivot points 56 into contact with the plates 40 on the projections 35 and in such position are disposed at an angle of substantially 45° to the horizontal. The plate 58 may be of such character as to reflect an image to a light sensitive photographic plate 68 mounted in the plate holder or cassette 28 and to permit rays of light to pass therethrough to a pair of sensitive plates 69 and 70 mounted in the vertical cassette or plate holder 26.

It will be noted, as shown in Fig. 4 of the drawings, that when the frame 57 is in the angular position thereof, the outer end of said frame extends beyond the forward edges of the member 18 and projects into the casing 12. The frame 57 may also be pivotally moved upwardly to a more vertical position so as to be wholly disposed within the member 18 without projecting therefrom.

The slots 64 and 65 in the bottom and side portions of the frame 57 are wider than the thickness of the plate 58 to permit a slight movement of said plate sideways within said slots. The slotted walls of said portions 60 and 61 formed by said slots 64 and 65, are provided in the four corners thereof with pairs of small set screws 72 extending through suitable threaded openings and having the heads thereof on the outside, and the inner ends thereof projecting into said slots to adjust the position of the plate 58 within said slots and for retaining said plate against movement. Thus by adjusting each pair of screws 72, fine adjustment of the filter plate 58 may be obtained. Portions of the sides 61 of the frame 57 may further be cut away as at 73 to receive said plates 40 when the frame is swung into inclined position, so that said plates 40 may partly directly contact the sides of the filter plate 58. By suitably manipulating the screws 39, and inserting shims of proper thickness between said plate 40 and surfaces 37, the angular position of the plate 58 may be further adjusted, so as to accurately position the same in the camera. The outer edges of the portions 61 of the frame are further provided with grooves or recesses 75 forming downwardly and outwardly inclined edges 76 adjacent the upper ends of said portions 61.

Slidably mounted within each of said grooves 43 is an elongated bar or member 78 projecting beyond the groove and formed with a longitudinal vertical through slot 79 adjacent the forward end thereof. One of the members 78 may further be formed on the inner side and adjacent the rear end thereof with a socket 80 receiving a spring pressed plunger 81 having a semi-spherical head 82 at the outer end adapted to be normally projecting from said socket. Extending into the slot 79 of each of said members 78 is a link 83 pivoted at the bottom end thereof to said member 78 and at the outer end thereof, as at 84, to a side portion 61 of the frame 57. Each link 83, as illustrated in Fig. 6 of the drawings, slidably contacts the inner side of one of the bars 55, the latter serving as a guide for the link.

It will now be understood that sliding movement of the member 78 in one direction will cause pivotal movement of the frame 57 in one direction, and sliding movement of the bars 78 in the opposite direction will cause pivotal movement of the frame 57 in the opposite direction.

The cassette or photographic plate holder 28 comprises a member 90 of substantially rectangular shape provided with grooves 91 in the side edges thereof, terminating as at 92 short of the rear of said cassette and adapted to receive the projecting portions of the bars 78, whereby the cassette 28 may be slidably mounted on the bottom wall 22. The inner surfaces of one of the grooves 91 is formed with a substantially semi-spherical indentation or recess 93 for receiving the spring pressed plunger head 82. Thus, upon mounting the cassette on the bottom wall 22, the forward end thereof will contact the heads 82 to press the member 78 forwardly as the cassette is pushed forwardly. The frame 57 is thus caused to swing downwardly until the same contacts the plates 40. Further pressure of the cassette forwardly will cause the plungers 81 to be depressed within the sockets 80 to permit the cassette to be pushed forwardly until the heads 82 spring into the recesses 93 at the limit of the forward movement of the cassette. The bottom surface of the member 90 is formed with a shoulder 95 to contact the rear edge 96 of said bottom wall 22 to limit forward movement of the cassette. Upon retracting the cassette by reason of the engagement of the plunger heads 82 within the recesses 93, the members 78 will be likewise retracted for swinging the filter frame 57 upwardly to the position shown in Fig. 2. When the bars 78 contact the ends 44 of the grooves 43, further retraction of the cassette 28 will force the head 82 out of the recess 93 to permit the cassette to be entirely withdrawn. Thus, insertion of the cassette will simultaneously cause the filter frame to be swung downwardly, and withdrawal of the cassette 28 will cause the filter frame to be swung upwardly into the member 18.

The member 90 may be further formed with a substantially rectangular recess 100 forming a bottom surface 101 to which there may be attached a pair of parallel bow springs 102. The photographic plate 68 is adapted to rest on the bow springs 102, the outer ends of which serve to press said plate against a pair of shoulders 103 formed at the ends of said recess 100. The forward end 105 of the member 90 is further formed with a slot 106 and said member 90 is provided with a surface 107 forming an extension of a slot 108 in the rear wall or end of said member 90. A slide 110 is adapted to be inserted within the slot 108 to rest on the surface 107, the forward end of said slide being adapted to enter the slot 106. The sides of the member likewise are provided with slots forming a continuation of slots 106 and 108 for receiving the side edges of said slide. A handle 111 may be formed on the rear end of said slide to permit the same to be withdrawn or inserted with respect to the cassette. The slide 108 acts as a shutter for the photographic plate 68 in the usual manner.

The rear end of said member 90 is formed with an upstanding tongue 112 and with a groove 113 parallel to said tongue. When the cassette 28 is pushed to its most forwardly position, as illustrated in Fig. 1 of the drawings, the tongue 112 is aligned with the vertical tongues 52 of the side walls 23 and 24, for the purpose hereinafter appearing.

The vertical cassette 26 comprises a member 120 of substantially rectangular shape and formed on the side edges thereof with grooves 121 adapted to slidably receive the vertical tongues 52. The bottom edge of the member 120 is formed with a groove 124 aligned with and forming a continuation of grooves 121 and adapted to receive the upstanding tongue 112 of the member 90. Thus, upon first inserting the horizontal cassette 28, the vertical cassette may be lowered on the rear of the frame 20 so that the tongue 112 may be received within the groove 124. The grooves 121 and 124 form a pair of spaced parallel tongues 125 and 126 on opposite sides thereof received within the grooves 53 and 113, whereby an effective light-tight construction is provided.

It will now be understood that when the cassettes are mounted in the position shown in Fig. 1 of the drawings, one cassette locks the other in place to prevent relative movement. The member 120 is further formed with a window opening 128 receiving the superimposed photographic plates 69 and 70, and having a shoulder 130 against which the edges of the plate contact. On the rear face thereof, the member 120 is further formed at the sides and at the bottom edge thereof with slots 131 slidably receiving a backing member 133 inserted from the top of the cassette. Hinged to the member 120 adjacent one end of the opening 128, as at 135, are a pair of spring arms 136 to the outer end of which there is attached bow springs 137, the outer ends of the latter being adapted to press the plates 69 and 70 against the shoulder 130. The backing plate 133 is adapted to press against the back of the spring arms 136 for forcing the bow springs against the plates whereby the plates are pressed together and against said shoulder 130. The front face of the member 120 is also formed at the bottom and on the sides thereof with grooves 140 and at the top thereof with a through slot 141 and slidably received within said slot 141 and grooves 140 is a slide 143 having a handle 144 at the upper end thereof. The slides 110 and 143 serve as shutters for the plates and are removed only just prior to the photographing operation as is well known in the art.

It will now be understood that light rays passing through the bellows will filter through the plate 58 and pass to the plates 69 and 70, and other rays will be reflected by the plate 58 downwardly to the plate 68, thus permitting three color photography by a single exposure.

To prevent rays of light from passing directly to the plate 68 from the bellows, there is pivotally mounted on the outer end of the frame 57 a screen member 150. Said member 150 comprises a pair of arms 151 having the outer ends thereof pivoted as at 152, to the recessed portion 75 of the side wall 61 of the frame 57. Attached to the lower end of the arms 151 is an opaque plate 154. As shown in Fig. 1 of the drawings, the plate 154 is adapted to lie against the front edge of the cassette 28 and extends above the same to cut off any rays of light that may pass through the bellows directly toward the plate 68, whereby only light reflected from the plate 58 may pass to said photographic plate 68.

When the parts are in the position shown in Fig. 1, the slides 110 and 143 may be withdrawn for the photographic operation. After the photographic operation, the slides are again inserted within the cassettes 28 and 26, respectively, and the vertical cassette 26 must be withdrawn first, to permit the horizontal cassette to be thereafter withdrawn to simultaneously swing the frame 58 and the screen 150 into the member 18. Thereafter, the member 18 may be detached from the camera by merely lifting the spring fingers 34 off the pins 33.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination, a camera having a rear open end, a frame detachably attached to said rear end, a pair of cassettes mounted on said frame at right angles to one another, and a filter plate pivotally mounted on said frame and movable to an angular position between said cassettes.

2. In combination, a camera having a rear open end, and an accessory therefor to adapt same for taking colored pictures detachably attached to said rear end of said camera, and supporting a pair of members having light sensitive surfaces at relative angular positions, and a light filter and reflector member supported on said accessory and disposed between said pair of members and cutting the angle therebetween and being pivoted for rotation about the end thereof adjacent the intersection of the planes of said pair of members.

3. In combination with a camera, an accessory therefor detachably attached to the rear of said camera, a cassette slidably mounted thereon, a filter plate pivoted to said accessory and means for causing pivotal movement of said plate upon causing sliding movement of said cassette.

4. An accessory for a camera comprising a member, a cassette slidably mounted thereon, a second cassette slidably mounted on said member and disposed perpendicularly to said first cassette, and means on one cassette for engagement with said other cassette to retain the same against movement.

5. An accessory for a camera comprising a member, a cassette slidably mounted thereon, a second cassette slidably mounted on said member and disposed perpendicularly to said first cassette, and interengaging tongue and groove means on said cassettes whereon one cassette may hold the other cassette against relative movement.

6. An accessory for a camera comprising a member, a light filter plate pivoted adjacent one end thereof to said member, a bar slidably mounted on said member, a link interconnecting said bar and filter plate, and a cassette slidably mounted on said member and having sliding engagement with said bar.

7. In combination with a camera open at the rear thereof, an accessory detachably attached to the rear end of said camera, a pair of cassettes mounted on said member and disposed at right angles to one another, and a filter plate mounted on said member and being movable to change the angular position thereof with respect to said cassettes.

8. In combination with a camera having a casing formed with a top wall, a bottom wall and side walls, and being open at the rear, an accessory therefor comprising a frame detachably attached to said casing and having a top wall, a bottom wall and side walls substantially aligned with the top, bottom and side walls of said casing, a cassette slidably mounted on the bottom wall of said frame and adapted to be projected into said casing to overlie a portion of the bottom wall thereof, a second cassette slidably mounted on the rear side of said frame to close said rear side, and a filter plate pivoted at the bottom edge thereof adjacent the rear bottom portion of the frame and adapted to be swung partially into said casing to project beyond the front side of said frame.

9. In combination with a camera having a casing formed with a top wall, a bottom wall and side walls, and being open at the rear, an accessory therefor comprising a frame detachably attached to said casing and having a top wall, a bottom wall and side walls substantially aligned with the top, bottom and side walls of said casing, a cassette slidably mounted on the bottom wall of said frame and adapted to be projected into said casing to overlie a portion of the bottom wall thereof, a second cassette slidably mounted on the rear side of said frame to close said rear side, and a filter plate pivoted at the bottom edge thereof adjacent the rear bottom portion of the frame and adapted to be swung partially into said casing to project beyond the front side of said frame, and means to prevent light rays entering the camera from passing directly to a photographic plate disposed within the first cassette.

10. In combination with a camera comprising a casing having a top wall, a bottom wall and side walls, and being open at the rear, an accessory therefor comprising a frame detachably attached to said casing and having a top wall, a bottom wall and side walls substantially aligned with the top, bottom and side walls of said casing, a cassette slidably mounted on the bottom wall of said frame and adapted to be projected into said casing to overlie the bottom wall thereof, a second cassette slidably mounted on the rear side of said frame to close said rear side, and a filter plate pivoted at the bottom edge thereof adjacent the rear bottom portion of the frame and adapted to be swung partially into said casing to project beyond the front side of said frame, and interlocking means on the bottom edge of the second cassette and on the top surface of said first mentioned cassette.

11. In an accessory for a camera, a frame for a filter plate, having a bottom portion, side portions, and a top portion, said bottom portion and side portions being formed with grooves, a filter plate mounted on said frame and having the side and bottom edges thereof received within said grooves, said grooves being wider than the thickness of said plate to permit side movement of said plate within said grooves to adjust the position of said plate, and means for fixing said plate to said frame in adjusted position.

12. In an accessory for a camera, a frame for a filter plate having a bottom portion, side portions, and a top portion, said bottom portion and side portions being formed with grooves, a filter plate mounted on said frame and having the side and bottom edges thereof received within said grooves, said grooves being wider than the thickness to said plate to permit side movement of said plate within said grooves to adjust the position of said plate, and means for fixing said plate to said frame in adjusted position, said means comprising a plurality of pairs of set screws in the grooved portions of said frame, each pair of screws being adapted to engage opposite sides of said plate.

13. An accessory for a camera comprising a member having a top wall, a bottom wall and side walls, said side walls being formed adjacent the bottom ends thereof with aligned, parallel grooves, bars slidably mounted within said grooves and projecting therefrom, a cassette slidably mounted on the bottom wall of said frame and having grooves in the side edges thereof slidably receiving said bars.

14. An accessory for a camera comprising a member having a top wall, a bottom wall and side walls, said side walls being formed adjacent the bottom ends thereof with aligned grooves, bars slidably mounted within said grooves and projecting therefrom, a cassette slidably mounted on the bottom wall of said frame and having grooves in the side edges thereof slidably receiving said bars, one of said bars having a spring pressed plunger provided with a head adapted to be projected therefrom inwardly of said bar, and the grooved surface of the cassette receiving said bar, having a recess adapted to receive said head.

15. An accessory for a camera having a top wall, a bottom wall and side walls, said side walls being formed with aligned parallel tongues, a cassette having side edges formed with grooves slidably receiving said tongues, the bottom edge of said cassette being formed with a groove aligned with said first mentioned grooves, and a second cassette slidably mounted on said bottom wall and having a tongue received within the groove in said bottom edge of said first cassette.

16. An accessory for a camera comprising a frame, means for pivotally mounting a filter plate on said frame, and said frame having a pair of projections adapted to support said plate in inclined position, and screw-threaded adjustable means on said projections for adjusting the inclination of said plate.

17. An accessory for a camera comprising a frame, means pivoted thereto for supporting a filter plate, a cassette slidably mounted on said frame, and means for causing pivotal movement of the filter plate in one direction upon slidably moving the cassette in one direction on said frame and for causing pivotal movement of said filter plate in the opposte direction upon slidably moving the cassette in the opposite direction.

18. An accessory for a camera comprising a frame, means pivoted thereto for supporting a filter plate, a cassette slidably mounted on said frame, and means for causing pivotal movement of the filter plate in one direction upon slidably moving the cassette in one direction on said frame and for causing pivotal movement of said filter plate in the opposite direction upon slidably moving the cassette in the opposite direction, and a second cassette slidably mounted on said frame and disposed at right angles to said first cassette.

19. An accessory for a camera comprising a frame, means pivoted thereto for supporting a filter plate, a cassette slidably mounted on said frame, and means for causing pivotal movement of the filter plate in one direction upon slidably moving the cassette in one direction on said frame and for causing pivotal movement of said filter plate in the opposite direction upon slidably moving the cassette in the opposite direction, and a second cassette slidably mounted on said frame and disposed at right angles to said first cassette, and interlocking tongue and groove means on said cassette.

20. An accessory for a camera comprising a frame having a top wall, a bottom wall and side walls, a cassette slidably mounted on the bottom wall of said frame, a second cassette slidably mounted on the rear open side of said frame to close the same, and a filter plate pivoted at the bottom edge thereof adjacent the rear of the bottom wall of said frame and adapted to be swung from a position wholly within said frame to a position wherein the upper portion of said plate projects beyond the front side of said frame.

21. An accessory for a camera comprising a frame having a top wall, a bottom wall and side walls, a cassette slidably mounted on the bottom wall of said frame, a second cassette slidably mounted on the rear open side of said frame to close the same, and a filter plate pivoted at the bottom edge thereof adjacent the rear of the bottom wall of said frame and adapted to be swung from a position wholly within said frame to a position wherein the upper portion of said plate projects beyond the front side of said frame, said first cassette projecting beyond the front side of said frame, and means on one of said cassettes for engaging the other cassette to limit relative movement thereof.

22. In combination with a camera, a cassette slidably mounted on the bottom of said camera, a second cassette slidably mounted on the rear side of said camera, a filter plate within said camera cutting the angle formed by said cassettes, and means to prevent light rays entering the camera from passing directly to a photographic plate disposed within said first cassette.

23. In combination with a camera, a cassette slidably mounted on the bottom of said camera, a second cassette slidably mounted on the rear side of said camera, a filter plate within said camera cutting the angle formed by said cassettes, means to prevent light rays entering the camera from passing directly to a photographic plate disposed within said first cassette, said means comprising a member hinged to said filter plate.

24. In combination with a camera, a cassette slidably mounted with respect thereto, a second cassette slidably mounted with respect to said camera, and disposed at an angle to said first cassette, one of said cassettes having means to engage the other cassette to prevent sliding movement thereof.

25. In a camera, a cassette movably mounted thereon, a filter plate movably mounted on said camera, and means cooperating with said cassette and filter plate to cause movement of said plate upon moving said cassette.

26. In a camera, a frame, for a filter plate, having grooves, a filter plate mounted on said frame and received within said grooves, said grooves being wider than the thickness of said plate to permit side movement of the plate with respect to said frame, and means for adjustably fixing the plate to said frame.

27. In combination, a camera having a rear open end, a frame detachably attached to said rear end, a filter plate within said frame and movable to project into the rear end of said casing.

28. In combination, a camera having a rear open end, a frame detachably attached to said rear end, a filter plate within said frame and movable to project into the rear end of said casing, a cassette mounted on said frame and movable to partly project into the said casing.

29. In combination, a camera having a rear open end, a frame detachably attached to said rear end, a filter plate within said frame and movable to project into the rear end of said casing, a cassette mounted on said frame and movable to partly project into the said casing, and means for moving the filter plate wholly within said frame upon withdrawing said cassette from said frame.

30. In a camera, a frame, for a filter plate, having grooves, a filter plate mounted on said frame and received within said grooves, said grooves being wider than the thickness of said plate to permit side movement of the plate with respect to said frame, and means for adjustably fixing the plate to said frame, and means for adjusting the position of the frame within said camera and maintaining the frame in adjusted position.

HENRY T. NEUMANN.